United States Patent
Reine et al.

[19]

[11] Patent Number: 6,023,473
[45] Date of Patent: Feb. 8, 2000

[54] APPLICATION PROGRAMMING INTERFACE FOR MODEM AND ISDN PROCESSING

[75] Inventors: Gerald A. Reine, Winchester, Mass.; Leo A. Goyette, Pelham, N.H.

[73] Assignee: Telebit Corporation, San Jose, Calif.

[21] Appl. No.: 08/893,192

[22] Filed: Jul. 15, 1997

Related U.S. Application Data

[60] Provisional application No. 60/022,812, Jul. 25, 1996.

[51] Int. Cl.$^7$ ........................................................ H04J 3/02
[52] U.S. Cl. ......................... 370/463; 370/465; 709/302
[58] Field of Search .................................. 370/420, 421, 370/463–465, 466, 469, 522, 282; 709/300, 301, 302

[56] References Cited

U.S. PATENT DOCUMENTS

| | | | |
|---|---|---|---|
| Re. 33,900 | 4/1992 | Howson | 370/105 |
| 4,438,511 | 3/1984 | Baran | 370/19 |
| 4,445,213 | 4/1984 | Baugh et al. | 370/94 |
| 4,578,796 | 3/1986 | Charalambous et al. | 375/8 |
| 4,620,294 | 10/1986 | Leung et al. | 364/900 |
| 4,679,227 | 7/1987 | Hughes-Hartogs | 379/98 |
| 4,757,495 | 7/1988 | Decker et al. | 370/76 |
| 4,884,285 | 11/1989 | Heynen et al. | 375/25 |
| 4,922,534 | 5/1990 | Gorniak et al. | 380/49 |
| 4,991,169 | 2/1991 | Davis et al. | 370/77 |
| 5,276,739 | 1/1994 | Krokstad et al. | 381/68.2 |
| 5,353,338 | 10/1994 | Nakano et al. | 379/99 |
| 5,483,530 | 1/1996 | Davis et al. | 370/465 |
| 5,497,373 | 3/1996 | Hulen et al. | 370/79 |
| 5,553,063 | 9/1996 | Dickson | 370/29 |
| 5,574,888 | 11/1996 | Panditji et al. | 395/500.47 |
| 5,835,089 | 11/1998 | Skarbo et al. | 709/302 |

OTHER PUBLICATIONS

Taylor, Kieran; "Analog and ISDN Acess Is in the Cards"; Nov., 1995.
Silberschatz, Abraham, and Galvin, Peter B., "Operating System Concepts," Addison–Wesley Publishing Company, Fourth Edition.

*Primary Examiner*—Ricky Ngo
*Attorney, Agent, or Firm*—Cesari and McKenna, LLP

[57] ABSTRACT

An application programming interface provides for command and data communication between a user, application or driver and a telephone data processing system which provides communication between a host computer and a telephone line. The telephone data processing system is capable of processing ISDN telephone calls as well as voice or analog-originated telephone calls. The application programming interface of the invention includes a host interface, an ISDN interface and a modem interface. The host interface receives commands and data from the user. The modem interface and ISDN interface provide commands and data communication between the host interface and the appropriate telephone call processing based on telephone call type. At the top level, the specific call type processing is transparent to the user. That is, the user need not know the type of telephone call, i.e., modem or ISDN, being processed.

10 Claims, 2 Drawing Sheets

APPLICATION PROGRAMMING INTERFACE FOR MODEM AND ISDN PROCESSING

RELATED APPLICATIONS

This application is based on U.S. Provisional Patent Application Ser. No. 60/022,812, filed Jul. 25, 1996, the disclosure of which is incorporated herein in its entirety by reference.

BACKGROUND OF THE INVENTION

Communication among computers is typically implemented over telephone lines. In analog or "voice" communication, a modem provides the interface between the telephone line and a host computer to convert telephone line signals to computer signals and computer signals to telephone signals. Modern telephone communications are also implemented in digital format. In one digital configuration, analog or voice originated data is digitized and transmitted in digital format over the telephone line. A digital modem can receive the digitized data and covert it to computer readable data. Alternatively, digital data transmitted over telephone lines in ISDN format is received by an ISDN terminal adapter which provides the interface between the digital telephone line and the host computer.

In any of these configurations, an interface must be provided between the host computer and the telephone processing equipment, i.e., the modem or terminal adapter. The interface, in both hardware and software, provides for command and data communication between the user and the modem or terminal adapter. The interface also allows an application or driver running on the host computer to interface with the modem or terminal adapter. The interface, commonly referred to an "application programming interface" or "API," transmits and receives commands and data to and from the modem or terminal adapter to implement computer/telephony communication.

Typically, the software application programming interface (API) runs on the host computer. It defines and maintains command and data structures required for communication between the host driver and the modem or terminal adapter. A conventional API is specific to the communication mode implemented on the applicable telephone line. That is, where ISDN communication is being provided, the API running on the host computer is specific to an ISDN terminal adapter. Where analog or voice is used, the API is specific to modem operation. Thus, traditionally, the host computer is interfaced to a single form of telephone line communication and runs an API applicable to only that single communication mode. If multiple communication modes are to be used, in a traditional configuration, the host computer must run an API for each mode.

SUMMARY OF THE INVENTION

The present invention is directed to an application programming interface. The API of the invention provides an interface between a host application, driver or user and telephone processing-equipment that is capable of processing ISDN telephone calls and analog or voice-originated calls. The API of the invention includes a host interface which transfers signals between the host computer driver or user and the telephone processing system. The API also includes a modem interface which transfers signals to and from the host interface and which transfers commands and data associated with analog or voice-originated telephone calls between the host interface and a modem processor within the telephone data processing system, the modem processor processing data associated with analog or voice-originated telephone calls. The API of the invention also includes an ISDN interface which transfers signals to and from the host interface and which transfers commands and data associated with ISDN telephone calls between the host interface and an ISDN processor in the telephone data processing system, the ISDN processor processing data associated with ISDN telephone calls.

The API of the invention can be used with a telephone processing system that is capable of processing data for both ISDN and analog-originated telephone calls. It can also process data for multiple simultaneous telephone calls of either type or of both types. Such a telephone data processing system is described in co-pending U.S. patent application Ser. No. 08/686,990, filed Jul. 25, 1996, now U.S. Pat. No. 5,949,762 entitled "Apparatus and Method For Processing Multiple Telephone Calls," assigned to the same assignee as the present application. The contents of that co-pending application are incorporated herein in their entirety by reference.

Despite the ability of the API of the invention to facilitate plural telephone call types, the specific type of call being processed is transparent to the user or driver. That is, the user can implement interface processing without knowing the type of call being processed. To this end, in the API of the invention, the host API is at the user level and accepts commands and data from the user. The API of the invention also includes two lower-level APIs, namely, a modem API and an ISDN API, which are implemented based upon the type of call being processed.

The modem API is implemented when voice or analog originated calls are processed. In this case, the host API processes and formats commands and data from the host or driver for modem processing. The modem API receives the modem commands and data from the host API and generates modem commands and data and forwards them to the modem processor in the telephone data processing system.

The ISDN API is implemented when ISDN calls are processed. For ISDN calls, the host API processes and formats commands and data entered by the host for ISDN processing. The command and data are received from the host API. In response, the ISDN API generates ISDN commands and data and forwards them to an ISDN processor in the telephone data processing system for ISDN processing.

The API of the invention provides numerous advantages over interfaces provided in conventional computer/telephone interface systems. The API of the invention provides the user with the flexibility of processing different types of telephone calls while not requiring the user to know which type of call is being processed. In other conventional systems, the API is specifically dedicated to a particular type of telephone call and, therefore, can only provide the user access to that type of call. The API of the invention provides the user with the ability to process different types of telephone calls, while maintaining transparency to the user, such that the user need not know the type of call being processed.

The API of the invention allows the user to process multiple telephone calls simultaneously, such calls being received in multiple channels of a basic rate ISDN (BRI) or a primary rate ISDN (PRI) telephone line. The ability to process multiple simultaneous telephone calls of multiple call types makes the API of the invention applicable to systems which regularly process multiple telephone calls simultaneously. Such systems could include Internet service providers. In conventional systems, both the hardware and the associated software interface had to be provided for each individual line. The system of the invention is therefore far less hardware and software intensive and, therefore, more efficient and less costly than conventional systems.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
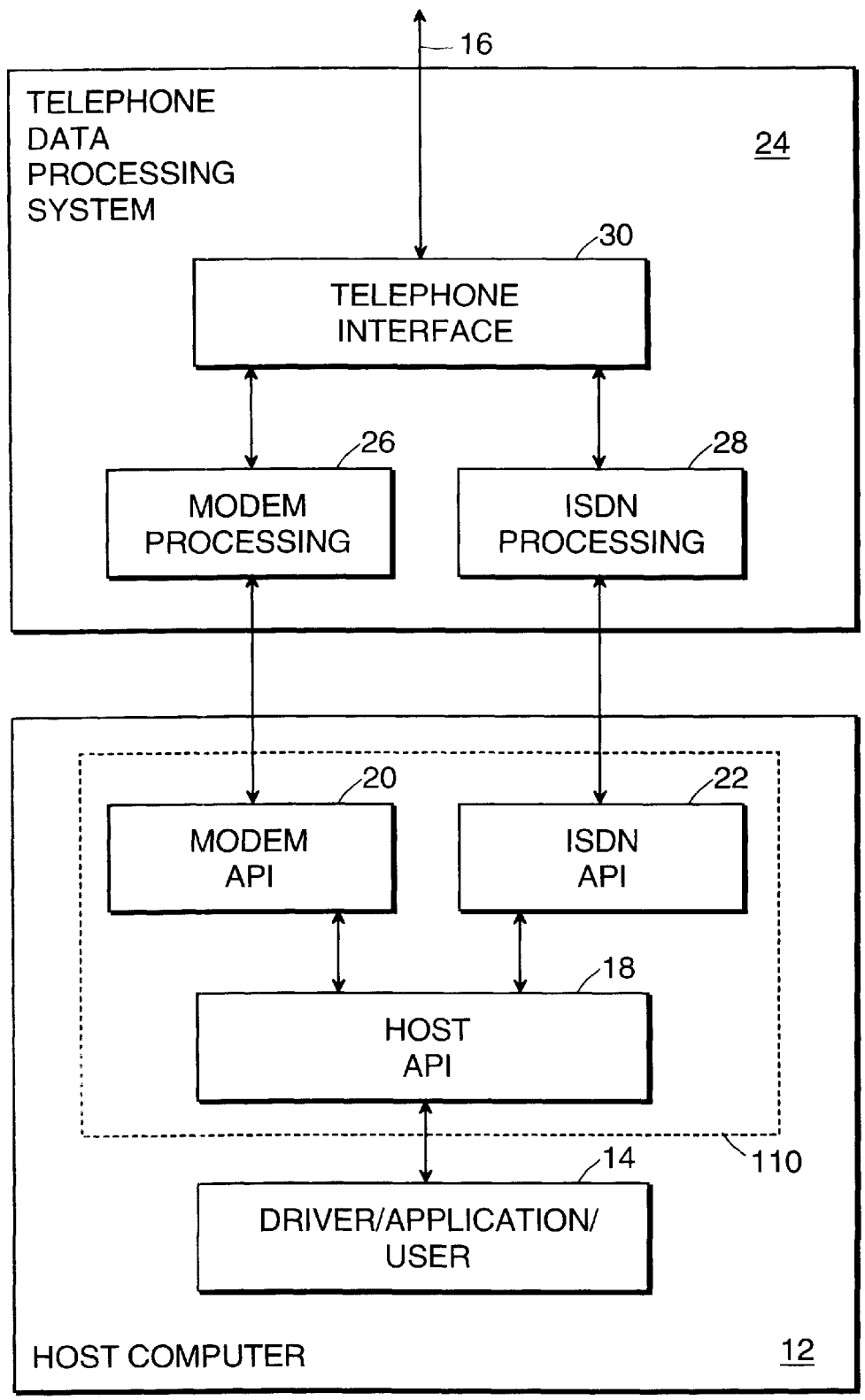
FIG. 1 is a schematic functional block diagram which illustrates the application programming interface of the invention.

FIG. 1 is a schematic functional block diagram that shows one embodiment of the application programming interface 110 of the invention. As shown in the figure, the API 110 of the invention is resident on a host computer 12. The API 110 interfaces with a driver or application or a user 14 which transmits commands and data to the API 110 to control the communication between the host computer 12 and telephone line 16.

In this embodiment, the API 110 includes a user-level host API 18, a lower-level modem API 20 and a lower-level ISDN API 22. The driver 14 interfaces with the API 110 via the host API 18. Depending upon the type of telephone call being processed, the host API 18 in turn interfaces with either the modem API 20 and/or the ISDN API 22. The commands issued by the driver 14 are independent of the type of telephone call. The API 18 identifies the call type and formats and forwards the appropriate commands and data to the modem API 20 and/or ISDN API 22. The driver need not be aware of the type of telephone call being processed and, therefore, need not select commands and data based on call type. That distinction is made by the host API 18.

In the embodiment depicted in FIG. 1, the API 110 of the invention interfaces with a telephone data processing system 24. The processing system 24 is capable of performing both modem processing 26 on analog or voice originated calls as well as ISDN processing 28 on ISDN type telephone calls. The telephone data processing system 24 can be of the type described as the MICA™ unit in the copending U.S. patent application Ser. No. 08/686,990, entitled "Apparatus and Method for Processing Multiple Telephone Calls," incorporated herein by reference.

The MICA™ unit described in that co-pending application includes a PRI interface board for performing ISDN processing 28 as well as a multiple-modem and port processor board used for modem processing 26. The multiple modem board, in one embodiment, includes five "hex modules," each of which is capable of processing six modem telephone calls simultaneously. Hence, the multiple-modem board can process up to thirty simultaneous telephone calls.

The telephone data processing system 24 also includes a telephone interface 30 which is connected to the telephone line 16. Data from modem processing 26 and/or ISDN processing 28 are formatted by the telephone interface 30 for transmission over the telephone line 16. When receiving from the telephone line, the telephone interface 30 receives incoming telephone data and formats it according to the telephone call type and forwards it to the appropriate processing 26 or 28.

Figure 2:
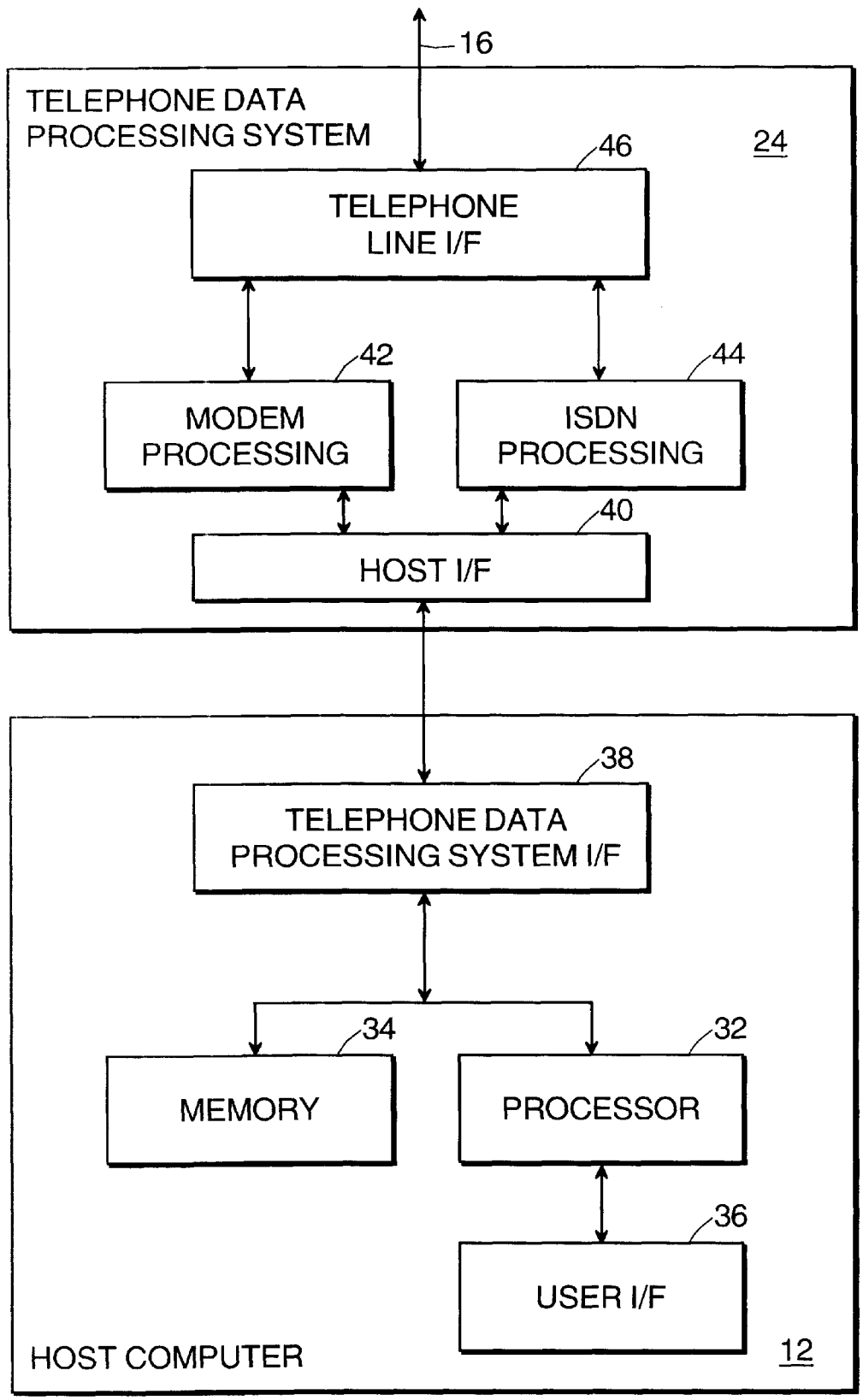
FIG. 2 is a schematic hardware block diagram which illustrates the application programming interface of the invention.

FIG. 2 is a schematic hardware block diagram which shows one embodiment of the API 110 (FIG. 1) of the invention. As described above in connection with FIG. 1, the API 110 is implemented on the host computer 12. The computer 12 can be any computer that includes a processor 32 coupled to a memory 34. In normal fashion, the processor 32 accesses data and instructions stored in memory 34 to execute the interface function of the present invention. The computer 12 can also include the user, interface 36 for providing input/output from/to the user, application or driver to control communication between the host computer 12 and telephone line 16. The computer 12 also includes an interface 38 which provides for communication between the host computer 12 and the telephone data processing system 24. The host interface 40 in the processing system 24 also facilitates that communication.

As described above, the telephone data processing 24 is capable of processing analog or voice-originated calls via modem processor 42 as well as ISDN calls via ISDN processor 44. A telephone interface 46 provides the hardware and software interface between the telephone line 16 and the modem 42 and ISDN 44 processors. As described above, the telephone data processing system 24 can be of the form of the MICA unit described in U.S. co-pending Patent application Ser. No. 08/686,990.

As described in that co-pending application, MICA is an acronym for Modem-ISDN Channel Aggregation and is used to identify the capability of the system to process both modem and ISDN data. The system includes a card set which includes a commercially available PRI interface card (ISDN processor 44) and a proprietary multiple-modem processing card (modem processor 42). The MICA card set is typically produced for use in ISA bus personal computers. The PC host software is responsible for command and data flow between the host-based driver and the MICA card set. The host software provides the interface 110 of the present invention.

The API 110 of the invention provides the software interface between the host computer operating system drivers and the modem 42 and ISDN 44 processors which, in one embodiment, are the MICA board set. This is done by providing an application programming library of function calls independent of operating system which provide command and data transfer and status reporting capabilities to the host application. As shown in FIG. 1, the host API 18 interfaces to both the modem API 20 and the ISDN API 22 and presents a single interface to the user. This layering enables the API 110 of the invention to present a consistent interface to a device driver even if the underlying board(s) should change.

The MICA board set is accessed via a shared memory interface. This interface allows the host software to address the boards' memory as though it was addressing host memory. The board memory is accessed through a window of a fixed size in a host memory space. While the host window does not move, the base address of the window can. This is accomplished by changing the addresses in the boards' page register. Each page of the boards' memory is the size of the host's memory window. In this way, the MICA boards' entire memory range can be accessed while using a small portion of the host memory space.

The host API 18 includes of a number of operating system-independent function calls to be made by an operating-system-specific driver. The OS driver uses this API 18 to manipulate the modem processor 42 and the ISDN processor 44, which, in one embodiment, comprise the MICA board set. The host API library provides an interface between the device driver 14 and lower-level board specific function calls in the modem API 20 and ISDN API 22. Table 1 contains a list of these host API function calls.

TABLE 1

Host API Function Call Summary

| Call Type | Function | Purpose |
|---|---|---|
| Initialization | MICA_Accept () | Accept an incoming call. |
| | MICA_Close () | Close a data channel; used for terminating a call |
| | MICA-Connect () | Dial the phone |
| | MICA_Init () | Initialize the boards; should be called once per board. |
| | MICA_Listen () | Listen on a channel for an incoming call. |
| | MICA_Open () | Open a channel for listening or dialing. |
| | MICA_Reset () | Reset a board; used when a board needs to be restarted. |
| Data Flow | MICA_Recv () | Receives data (if any) from a previously opened channel. |
| | MICA_Select () | Check a channel's status. |
| | MICA_Send () | The channel must be opened first; sends data out to the MICA board set. |
| Control Messages | MICA_GetOption () | Get the status of a system option. |
| | MICA_ProcessInt () | Process a MICA interrupt. |
| | MICA_SetOption () | Set or modify a system option. |

All of the host API function calls send parameters with each function call. Each function also returns a result code to indicate the result of the function call. Each function call will now be described in detail.

The MICA_Accept call is used to accept an incoming call on a particular channel. A sample format for the call is as follows:

```
MICA_Accept (
int16            channelId
)
```

The parameter channelId indicates the ID number of the channel on which the call is to be accepted. The possible result codes are as follows:

| MICA_SUCCESS | The call is accepted. |
|---|---|
| MICA_ERROR | The call is rejected. |

The MICA_Close function call is used to close a data channel. A sample format is as follows:

```
MICA_Close (
int16            channelId
)
```

The parameter channelId is used to identify the channel that is to be closed. The possible result codes are as follows:

| MICA_SUCCESS | The channel is closed. |
|---|---|
| MICA_INVALID_CHANNEL | The channel provided was not valid. |
| MICA_NOT_OPEN | The channel was not open. |
| MICA_ERROR | Either the ISDN or the modem board didn't close. |

The MICA_Connect function call is used to open a data channel to initiate an out-going telephone call. A sample format for the call as follows:

```
MICA_Connect (
int16            channel Id,
char             *phoneNumber,
void             (*callBack)(channelId, event_mask)
)
```

If the optional callBack routine is provided, it is executed after the connection is made. The channelid is returned with the callBack routine allowing a use of a single callBack routine with many channels. The event—mask reflects the state of the channel after the connection is made. The parameter channelId identifies the channel to be dialed. If the callBack routine is used, the channeled is provided. The parameter phoneNumber is a pointer to the phone number to be dialed. The number is in ASCII text format. The callBack parameter identifies the callback routine, and the parameter event—mask identifies the status of the channel after the connection is completed. It should be noted that prior to calling the MICA Connect function, the application must call MICA_Open. The possible result codes returned after the MICA_Connect call are as follows:

| MICA_CHANNEL_NOT_OPEN | The channel was not opened. |
|---|---|
| MICA_CONNECT_NO_CHANNELS | There are no available channels. |
| MICA_ERROR | General Error message. |
| MICA_INVALID_CALL_TYPE | The call type was invalid. |
| MICA_SUCCESS | Connecting. |
| MICA_INVALID_CHANNEL | The channelId provided was invalid. |

The MICA_GetOption function call is used to get status and other information from the board set. A sample format for the MICA_GetOption call is as follows:

```
MICA_GetOption(
int16            channelId,
int16            *micaCommand,
char             *returnData
)
```

The requested data is written into the returnData buffer. Note that this buffer should be large enough to hold the maximum size return message. The parameter board—set identifies the MICA board set on which the operation is to be performed. The micaCommand parameter identifies the command, and the returnData parameter indicates the returned data value. The possible result codes are as follows:

| MICA_INVALID_COMMAND | The specified command was not recognized. |
|---|---|
| MICA_SUCCESS | The command completed successfully. |
| MICA_ERROR | The command failed to complete. |

The MICA_Init function call is used to initialize the telephone data processing system 24. For one embodiment, a sample format for the call is as follows:

```
MICA_Init (
    mica_status_str      * micaStr,
    char                 *buffer,
    int16                buffer_len,
    int16                channels,
    int16                channelIds
)
```

The micaStr parameter identifies the MICA status structure. The buffer parameter identifies memory allocated for MICA structures. The buffer—len parameter identifies the size of the buffer in bytes. The channels parameters identifies the number physical channels, and the channelIds parameter identifies the number of virtual channels. The possible result codes are as follows:

| | |
|---|---|
| MICA_INIT_INSUFFICIENT_DATA | Not enough information was provided. |
| MICA_INIT_INSUFFICIENT_BUFFER | The buffer provided was too small. |
| MICA_ERROR | The command failed to complete. |
| MICA_SUCCESS | The command completed successfully. |

Note: the calling application is responsible for allocating sufficient space for the MICA Status structure (for example malloc (size of (mica_status_str))). The MICA API assumes sufficient space has been allocated.

The MICA_Listen function call is used to open a data channel to receive an incoming call. An example of its format is as follows:

```
MICA_Listen (
    int16       channelId,
    char        *phoneNumber,
    void        (*callBack)(channelId, event mask)
)
```

The channelId parameter indicates the assigned channel. When used in the callBack routine, the channelId represents the channel on which the called was received. The phoneNumber parameter indicates the number to listen for; the callBack parameter indicates the routine that is to be executed when the call arrives and the parameter event—mask indicates the state of the channel after the call is accepted. Possible result codes are as follows:

| | |
|---|---|
| MICA_SUCCESS | The channel was opened successfully. |
| MICA_CHAN_INVALID | The channel parameter was invalid. |

The MICA_Open function call is used to open a data channel. A sample format for the call is as follows:

```
MICA_Open (
    int16       callType,
    int16       direction,
    int16       assignResource,
    int16       *error
)
```

The callType parameter indicates the type of call being requested, i.e., ISDN or modem. The direction parameter indicates whether the call is an inbound or outbound call. The assignResource parameter allocates the modem or ISDN channel to the identified MICA channel. This parameter is typically assigned a Boolean true/false variable. The error parameter is a pointer to a variable for error reporting. This avoids confusion between a valid channel ID and an error value. The optional callType and direction parameters are of particular use when some channels arc restricted to outbound or inbound calls only. The assignResource parameter is useful when over-subscription of the channels is allowed. If the call is successful, a channelId is returned. If an error occurred, MICA_ERROR is returned. The error type is identified in the error byte. The possible values for error are:

| | |
|---|---|
| MICA_OPEN_INVALID_TYPE | The callType is invalid. |
| MICA_OPEN_INVALID_DIRECTION | The direction was invalid. |
| MICA_OPEN_NO_CHANNELS | No idle channels. |

The MICA_ProcessInt function call is used to process an interrupt. Once an interrupt service routine or polling routine has detected that a board needs service, this routine is used to service the board. A format for the call is as follows:

```
MICA_ProcessInt(
    int16       intType,
    int16       callType
)
```

The intType parameter indicates the type of interrupt received, i.e., data or control. The callType parameter indicates the call type, i.e., ISDN or modem. The possible result codes are as follows:

| | |
|---|---|
| MICA_SUCCESS | The board(s) were successfully serviced. |
| MICA_ERROR | An error occurred while servicing the boards(s). |

The MICA_Recv function call is used to hand a data buffer to receive data for a specific channel. A format for the call is as follows:

```
MICA_Recv (
    int16       channelId,
    char        *dataBuffer,
    int16       bufferSize
)
```

The channelId parameter indicates the channel from which data is received. The dataBuffer parameter indicates the buffer in which the data is placed, and the bufferSize parameter indicates the number of bytes that can be written into the buffer. The buffer-Size parameter is normally the maximum number of bytes that can be inserted into the data buffer. The return result is typically the number of bytes actually written into the data buffer. If an error occurred while data is being copied into the buffer, an error bit, typically −1, is returned. The MICA_Reset function call is used to reset the MICA board set(s). A format for the call is as follows:

```
MICA_Reset(
    int16                board_to_reset
)
```

The parameter board—to—reset indicates which board is to be reset, since more than one MICA board set can be used in the system. After this function is called, the MICA board set must be reinitialized by calling MICA_Init before any other calls can be made. The typical result codes returned after a MICA Reset call are as follows:

| | |
|---|---|
| MICA_SUCESS | The board set was successfully reset. |
| MICA_ERROR | An error occurred while resetting the board(s). |
| MICA_INVALID_NUMBER | board_to_reset was set to an invalid number. |

The MICA_Select function call is used to obtain channel status information such as the connection state of a particular channel. A format for the call is as follows:

```
MICA_Select (
int16 channelId,
int16 statusMask
)
```

The parameter channelId identifies the channel, and statusMask is a data word which masks off unwanted information. If the statusMask is set to zero, the space available in the transmit buffer is returned in response to the function call. The returned value is either the channel status, the space available in the transmit buffer or MICA_ERROR. If the most significant bit of the returned value is set, the returned value is MICA_ERROR, not the channel status.

The MICA_Send function call is used to hand a data buffer to a specific channel. A format the MICA_Send call is as follows:

```
MICA-Send (
    int16               channelId,
    char                *dataBuffer,
    int16               bytes
)
```

The channelId parameter identifies the channel from which data is received; the dataBuffer parameter identifies the buffer into which the data is placed; and the bytes parameter indicates the total number of bytes to be transmitted. It should be noted that data cannot be transmitted until a channel has entered the active state. Successfully connecting to a destination or accepting an incoming call causes the channel to transition to the active state. The channel's status may be verified by using the MICA Select call. The result of the MICA Send call is the number of bytes actually transmitted. If an error occurs during transmit, MICA_ERROR (−1) is returned.

The MICA_SetOption call is used to send various command and control messages to the MICA telephone data processing system 24. A list of the commands that can be sent is contained in Tables 2 and 3. Table 2 lists modem mode commands, and Table 3 lists ISDN mode commands.

TABLE 2

Set Channel Option Modem Commands

| Command | Value(s) | Description |
|---|---|---|
| MICA MODEM_MODE | Originate/Answer | Set the modem to Originate or Answer mode |
| MICA_MODEM_CALL_TONE | Send | Determines whether the modem should send calling tone or not. |
| MICA_MODEM_GUARD_TONE | Use Tone | Should the modem use guard tone for V 22/V22bis. |
| MICA_MODEM_FORMAT | Async, LAPM, MNP, ARA | Set the modem's data transmission format negotiation parameters. |
| MICA_MODEM_AUTOD | Autodetect | Automatically detect the peer's protocol. |
| MICA_MODEM_AUTOD_TO | 0–25.5 s | Autodetect timeout period. |
| MICA_MODEM_BREAK_MODE | Expedited, Destructive | Sets the break processing method for the modem. |
| MICA_MODBM_BUFF_LEN | 0–64 | Protocol buffer length. |
| MICA_MODEM_NEGOT_TO | 0–25.5 s | Timeout for Protocol Negotiation. |
| MICA_MODEM_NEGOT_FALL_B | ASCII Value | The character causing negotiation fallback. |
| MICA_MODEM_COMPRESSION | None, V.42bis, MNP5 | Compression method used by the modem. |
| CA_MODEM_MODEM_VXX | V.34bis, V.32bis, V.22bis | The modem standard to use. |

TABLE 2-continued

Set Channel Option Modem Commands

| Command | Value(s) | Description |
| --- | --- | --- |
| MICA_MODEM_MAX_CONN_RATE | 1–14 | 2400 * the number specified. |
| MICA_MODEM_MIN_CONN_RATE | 1–14 | 2400 * the number specified. |
| MICA_MODEM_SIG_QUAL_LEVEL | 1–5 | The line signal quality threshold. |
| MICA_MODEM_TX_LEVEL | 0–15 dbm | The transmit level. |
| MICA_MODEM_IDLE_TO | 1–255 s | Idle line timeout. |
| MICA_MODEM_FRAME_RETX | 0–255 s | Frame retransmission-limit. |
| MICA_MODEM_NO_DCD_HANGUP | 0–25.5 s | Lost carrier hang-up delay. |
| MICA_MODEM_RETRAIN_DISC | 1–255 s | Consecutive re-train disconnects. |
| MICA_MODEM_FALL_FWD_TIMER | 1–255 s | 0 Disconnects. |
| MICA_MODEM_RDL_RESPONSE | Enable | Remote Diagnostic Loopback response. |
| MICA_MODEM_COUNTRY_CODE | 0–255 | Country Location. |
| MICA_MODEM_MIN_ANSWER_BACK | 0–255ms | Answer back time. |
| MICA_MODEM_CALL_TONE_GAIN | 0–15 dbm | Call Tone Gain. |
| MICA_MODEM_V.34_INFO | | Information bits for V.34. |

TABLE 3

Set Channel Option ISDN Commands

| Command | Value(s) | Desription |
| --- | --- | --- |
| MICA_ISDN_ADD_BONDING | 1–29 | Adds an additional Bonding channel. |
| MICA_ISDN_B_CHANNEL | 1–29 | Requests a specific B channel. |
| MICA_ISDN_CALL_TYPE | Voice, Modem, 56K, 64K | Describes the call type. |
| MICA_ISDN_CALLED_PARTY | Number | Sets the Called Party Number for identifiction of incoming calls and the number dialed for outgoing calls. |
| MICA_ISDN_CALLING_PARTY | Number | Sets the Calling Party Number for identification of incoming calls. |
| MICA_ISDN_REDIRECT | Number | Redirect the call. |

A sample format for the MICA SetOption function call is as follows:

```
MICA_SetOption (
int16            channelId,
unsigned long    micaCommand,
char             *arg
)
```

The board—set parameter identifies the MICA board set to be modified. The micaCommand parameter is the command being sent and the arg parameter is the command modifier. The commands are validated and then routed to the appropriate modem or ISDN routine. Possible result codes are as follows:

| | |
| --- | --- |
| MICA_INVALID_COMMAND | The command specified was not recognized. |
| MICA_SUCCESS | The command completed successfully. |
| MICA_ERROR | The command failed to complete. |

As previously indicated the host API 18 described above interfaces with lower-level APIs 20 and 22 depending upon the call type. Where a call is a modem type call, the host API 18 interfaces with the modem API 20. The modem API 20 provides low-level function calls to modem processing such as that described in the co-pending patent application Ser. No. 08/686,990, incorporated herein. The modem API library of function calls provides an interface between the host API 18 and board-specific function calls. Table 4 includes a list of these modem API functions.

TABLE 4

Modem API Function Call Summary

| Call Type | Function | Purpose |
| --- | --- | --- |
| Call Management | MICA_MODEM_Close ( ) | Terminate a call. |
| | MICA_MODEM_Intitiate | Either originate or answer a call. Determined by the modem configuration. |
| | MICA_MODEM_LinkCtrl ( ) | Force speed shift in modem. |
| | MICA_MODEM_ProcessCtrlMsg ( ) | Process a control message interrup from the modem board. |
| | MICA_MODEM_ProcessDataMsg ( ) | Process a data message interrupt from the modem board. |
| | MICA_MODEM_Reset ( ) | Software reset of the modem. |
| | MICA_MODEM_SendCtrlMsg ( ) | Send a control message to the modem. |
| | MICA_MODEM_SetOption ( ) | Set Modem Options. |
| Data Flow | MICA_MODEM_Recv ( ) | Receive data from the modem. |
| | MICA_MODEM_SEND ( ) | Send data to the modem. |
| Initialization | MICA_MODEM_Configure ( ) | Used to configure a modem for a calll. |
| | MICA_MODEM_Init ( ) | Initialize the System information. |
| | MICA_MODEM_Load ( ) | Load the Modem Board. |
| Status | MICA_MODEM GetOption ( ) | Used to solicit the link state info. |

A detailed description of each of the modem API function calls follows.

The MICA_MODEM_Close function call is used to terminate a telephone call. A format for the call is as follows:

```
MICA_MODEM_Close (
channel_str
)
```

The channelPtr parameter is used to identify the channel that is to be closed. Possible result codes are as follows:

| MICA_Chan_Invalid | The channel was not valid. |
| --- | --- |
| MICA_SUCCESS | The channel will be closed. |

The MICA_MODEM_Configure function call is used to configure a modem. A format for the function is as follows:

```
MICA_MODEM_Configure(
int16      channelId,
int16      dial,
)
```

The channelId parameter identifies the modem to be modified and the dial parameter indicates whether the modem should dial a telephone number. The result code that can be returned following the function are as follows:

| MICA_SUCCESS | The command was sent to the modem. |
| --- | --- |
| MICA_ERROR | An error occurred. |

The MICA_MODEM_GetOption function is used to retrieve the status of a modem. A format for the function call is as follows:

```
MICA_MODEM_GetOption (
channelId_str    *channelIdPtr,
int16            command,
char             *arg
)
```

The channelIdPtr parameter identifies the modem to be modified; the command parameter identifies what is to configured and the arg parameter is a pointer to the buffer for the returned data. Possible result codes are as follows:

| MICA_MODEM_SUCCESS | The command was sent to the modem. |
| --- | --- |
| MICA_MODEM_ERROR | The parameter was invalid. |

The MICA_MODEM_Init function call is used to initialize the modem board. A format for the call is as follows:

```
MICA_MODEM_Init (
modem str      *modemBoard
)
```

The parameter modemBoard is a pointer to the modem board structure. Possible result codes are as follows:

| MICA_SUCCESS | The command was sent to the modem. |
| --- | --- |
| MICA_MODEM_PARAM_INVALID | The parameter was invalid. |
| MODEM CHAN INVAL ID | The channel was invalid. |

It should be noted that this function should be called prior to calling MICA_MODEM_Load.

The MICA_MODEM_Initiate function call is used to call the modem to originate or answer a call on a data channel. A format for the function is as follows:

```
MICA_MODEM_Initiate (
    channelId_str              *channelIdPtr
)
```

The channelIdPtr parameter identifies the channel of the telephone call. It should be noted that the ISDN processor 44 in the telephone data system 24 must have accepted an inbound call or originated an outbound call prior to calling this function. Possible result codes include:

| | |
|---|---|
| MICA_MODEM_SUCCESS | The command was sent to the modem. |
| MICA_MODEM_PARAM_INVALID | The parameter was invalid. |
| MODEM_CHAN_INVALID | The channel was invalid. |

The MICA_MODEM_Load function call is used to load the modem board. A format for the function call is as follows:

```
MICA MODEM Load (
    modem_str                  *modemBoard
)
```

The parameter modemBoard is a pointer to the modem board structure. Possible result codes are as follows:

| | |
|---|---|
| MICA_SUCCESS | The board was loaded. |
| MICA_ERROR | The parameter was invalid. |

The MICA_MODEM_Recv function call is used to receive data from a specific modem. A format for the function call is as follows:

```
MICA_MODEM_Recv (
    channel_str                *channelPtr,
    char                       *dataBuffer,
    int16                      buffer size
)
```

The channelPtr parameter identifies the channel from which the data is received; the dataBuffer parameter identifies the buffer into which the data is placed; and the buffer size parameter indicates the maximum number of bytes that can be placed in the buffer. The result code value returned by the function is the number of bytes actually received.

The MICA_MODEM_Reset function call is used to perform a software reset of a modem board. A format for the function call is as follows:

```
MICA_MODEM_Reset (
    int16                      board
)
```

The board parameter identifies the board that is to be reset. Possible result codes are as follows:

| | |
|---|---|
| MICA_SUCCESS | The board was reset. |
| MICA_ERROR | The board number was invalid or the board failed to reset. |

The MICA_MODEM_Send function call is used to send data to a specific modem. A format for the function call is as follows:

```
MICA_MODEM_Send (
    channel_str                *channelPtr,
    char                       *dataBuffer,
    int16                      bytes
)
```

The channelPtr parameter indicates the channel that the modem is assigned to or associated with. The dataBuffer parameter identifies the buffer in which the data is located; and the bytes parameter indicates the number of bytes to be sent. It should be noted that data cannot be transmitted until the modem has entered the active state. The function call MICA_MODEM_Intiate will cause the modem to transition to the active state. The modem's status may be verified by using the MICA_Select function call. The result value of the MICA_MODEM_Send call is the number of bytes actually transmitted or MICA_ERROR if an error occurred during the send process.

The MICA_MODEM_SetOption function call is used to configure a modem. A format for the call is as follows:

```
MICA_MODEM_SetOption (
    channelId_str              *channelIdPtr,
    int16                      command,
    char                       *arg
)
```

The channelIdPtr parameter is the channel identifier for the modem to be modified. The command parameter is the configuration command, and the arg parameter is a pointer to the command parameter, if any. Possible result codes returned by the function call as follows:

| | |
|---|---|
| MICA_MODEM_SUCCESS | The command was sent to the modem. |
| MICA_MODEM_PARAM_INVALID | The parameter was invalid. |
| MICA_MODEM CHAN_INVALID | The channel was invalid. |

The ISDN API 22 provides the interface between the host API 18 and ISDN processing 28. The function of the ISDN API 22 is to provide low-level function calls to the ISDN processor 44. Like the modem API 20, the ISDN API 22 also includes a number of function calls made by the host API 18. The host API 18 uses the ISDN API 22 to control and manipulate the ISDN processor 44. The ISDN API 22 provides a layer of abstraction between the host APII 18 and lower-level ISDN-board specific calls. Table 5 contains a list of the lower-level ISDN function calls.

TABLE 5

ISDN API Function Call Summary

| Call Type | Function | Purpose |
|---|---|---|
| Initialization | MICA_ISDN_Init ( ) | Initialize the ISDN board. |
| | MICA_ISDN_Initiate ( ) | Open a data channel. |
| | MICA_ISDN_Load ( ) | Load the board's software. |
| | MICA_ISDN_SetPath ( ) | Route a call onto the MVIP line or the PRI line. |
| | MICA_ISDN_Start ( ) | Starts the board. |
| | MICA_ISDN_Status ( ) | Retrieves ISDN board status. |
| Call Management | MICA_ISDN_Close ( ) | Close a data channel. |
| | MICA_ISDN_GetOption ( ) | Performance. |
| | MICA_ISDN_Reset ( ) | Reset the IDSN board. |
| | MICA_ISDN_SetOption ( ) | Call Control Messages. |
| Data Flow | MICA_ISDN_Recv ( ) | Receive ISDN Data. |
| | MICA_ISDN_Send ( ) | Send ISDN Data. |

A detailed description of each ISDN API function call follows.

The MICA_ISDN_Init function call is used to initialize the ISDN board. A format for the function call is as follows:

```
MICA_ISDN_Init(
    isdn_str        *isdnStr;
)
```

The isdnStr parameter points to the structure containing the board initialization information. The possible result codes returned by the function are as follows:

| | |
|---|---|
| MICA_ISDN_Success | The board was initialized. |
| MICA_ISDN_Error | An error occurred. |

The MICA_ISDN_Initiate function call is used to cause the ISDN board to originate or answer a call on a data channel. A format for the function call is as follows:

```
MICA_ISDN_Initiate(
    channelId_str       *channelIdPtr
)
```

The channelIdPtr parameter is a pointer to the channel identification structure to identify the channel on which the call is to be originated or answered. The possible result codes that can be returned in response to the function are as follows:

| | |
|---|---|
| MICA_ISDN_SUCCESS | The command was sent to the ISDN board. |
| MICA_ISDN_PARAM_IN-VALID | The parameter was invalid. |
| MODEM_CHAN_INVALID | The channel was invalid. |

The MICA_ISDN_Recv function is used to receive data from a specific ISDN channel. A format for the function call is as follows:

```
MICA_ISDN_Recv(
    channel_str     *channelPtr,
    char            *dataBuffer,
    int16           bufferSize
)
```

The channelPtr parameter identifies the channel to which the ISDN channel is assigned. The dataBuffer parameter identifies the buffer in which the data is located, and the bufferSize parameter indicates the maximum number of bytes that the buffer can hold. The result value of the function indicates the number of bytes actually received, or MICA_ERROR can be returned if an error occurred during reception.

The MICA_ISDN_Reset function is used to reset the ISDN board to a known state. A format for the function call is as follows:

```
MICA_ISDN_Reset (
    isdn_str        *isdnStr
)
```

The ISDNStr parameter points to the structure containing the ISDN board information. The possible result codes are as follows:

| | |
|---|---|
| MICA ISDN Success | The board was reset. |
| MICA ISDN_Error | An error occured. |

The MICA ISDN_SetOption function call is used to send call control messages to the ISDN board. A format for the function call is as follows:

```
MICA ISDN_SetOption (
    channel_str     *channelPtr,
    int16           command,
    char            *arg
)
```

The channelPtr parameter identifies the channel carrying the telephone call. The command parameter is the command sent to the ISDN board, and the arg parameter points to a message structure or parameters used in the function, if any. The possible result codes are as follows:

| | |
|---|---|
| MICA_ISDN_Success | The command was sent to the modem. |
| MICA_ISDN_Command_In-valid | The parameter was invalid. |
| MODEM_Chan_Invalid | The channel was invalid. |

The MICA_ISDN_SetPath function is used to route data onto the MVIP bus or onto the PRI line. A format for the function call is as follows:

```
MICA_ISDN_SetPath (
    channel_str          *channelPtr,
    isdn_str             *isdnStr
)
```

The channelPtr parameter points to the channel whose data is being routed. The isdnStr parameter points to the structure containing the board initialization information. Possible result codes are as follows:

| | |
|---|---|
| MICA_ISDN_Success | The route was established. |
| MICA_ISDN_Error | An error occurred. |

The MICA ISDN_Send function call is used to send data to a specific ISDN channel. A format for the function call is as follows:

```
MICA ISDN_Send (
    channel_str      *channelPtr,
    char             *dataBuffer,
    int16            bytes
)
```

The channelPtr parameter indicates the channel to which the ISDN channel is assigned. The dataBuffer parameter indicates the buffer in which the data is located, and the bytes parameter indicates the total number of bytes to be transmitted. It should be noted that data cannot be transmitted until the ISDN channel has entered the active state. The MICA_ISDN CHANNEL_Initiate function call causes the ISDN channel to transition to the active state. The ISDN channel's status may be verified by using the MICA_ISDN CHANNEL—Status function call. The result returned in response to the function call is the number bytes actually transmitted.

The MICA_ISDN_Status function call is used to retrieve status from an ISDN board. A format for the function call is as follows:

```
MICA_ISDN_Status (
    channel_str       * channelPtr
    int16             command
    message_str       *messagePtr
)
```

The channelPtr parameter is used to identify the channel whose status is being examined. The command parameter is the status command, and the messagePtr parameter is a pointer to a message structure containing the call parameters. Possible result codes are as follows:

| | |
|---|---|
| MICA_ISDN_Success | The command was sent to the modem. |
| MICA_ISDN_Command_In-valid | The parameter was invalid. |
| MODEM_Chan_Invalid | The channel was invalid. |

The MICA_ISDN_Close function call is used to close a data channel. A format for the function call is as follows:

```
MICA_ISDN_Close (
    channel_str          *channelPtr
)
```

The channelPtr parameter is used to identify the channel that is to be closed. It should be noted that prior to calling this function, the application should issue a ISDN_Disable_Data_Channel control message. The possible result codes that can be returned in response to the MICA_ISDN_Close function are as follows:

| | |
|---|---|
| MICA ISDN_Closed | The channel was closed successfully. |
| MICA_ISDN_Chan_Invalid | The channel parameter was invalid. |

While this invention has been particulary shown and described with references to preferred embodiments thereof, it will be understood by those skilled in the art that various changes in form and details may be made therein without departing from the spirit and scope of the invention as defined by the appended claims.

What is claimed is:

1. An application programming interface for providing an interface between a host computer driver and a telephone data processing system, said telephone data processing system being capable of processing analog type telephone calls and ISDN telephone calls, said application programming interface comprising:

a host interface which transfers signals to and from the host computer driver;

a modem interface which transfers signals to and from the host interface and which transfers commands and data associated with analog type telephone calls to and from a modem processor in the telephone data processing system, the modem processor processing analog type telephone calls; and an ISDN interface which transfers signals to and from the host interface and which transfers commands and data associated with ISDN telephone calls to and from an ISDN processor in the telephone data processing system, the ISDN processor processing ISDN telephone calls.

2. The application programming interface of claim 1 wherein the modem interface transfers commands and data to and from the modem processor to process multiple simultaneous analog type telephone calls.

3. The application programming interface of claim 1 wherein the ISDN interface transfers commands and data to and from the ISDN processor to process multiple simultaneous ISDN telephone calls.

4. The application programming interface of claim 1 wherein the host interface transfers signals to and from the host driver to process multiple analog type and ISDN telephone calls.

5. The application programming interface of claim 1 wherein the signals transferred to and from the host computer driver are independent of a call type of a telephone call being processed.

6. A method of providing communication between a host computer driver and a telephone data processing system that is capable of processing analog type telephone calls and ISDN telephone calls, said method comprising:

providing a host interface which transfers signals to and from the host computer driver;

providing a modem interface which transfers signals to and from the host interface and that transfers commands and data associated with analog type telephone calls to and from a modem processor in the telephone data processing system, the modem processor processing analog type telephone calls; and providing an ISDN interface which transfers signals to and from the host interface and that transfers commands and data associated with ISDN telephone calls to and from an ISDN processor in the telephone data processing system, the ISDN processor processing ISDN telephone calls.

7. The method of claim 6 further comprising, with the modem interface, transferring commands and data to and from the modem processor to process multiple simultaneous analog type telephone calls.

8. The method of claim 6 further comprising, with the modem interface, transferring commands and data to and from the modem processor to process multiple simultaneous analog type telephone calls.

9. The method of claim 6 further comprising, with the host interface, transferring signals to and from the host driver to process multiple analog type and ISDN telephone calls.

10. The method of claim 6 the signals transferred to and from the host computer driver are independent of a call type of a telephone call being processed.

* * * * *